Sept. 18, 1945.   S. V. HAAS, JR., ET AL   2,385,202
SPRING CLASP FOR SPLIT CYLINDERS
Filed Aug. 11, 1944
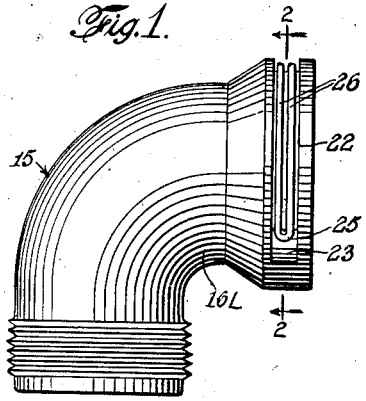
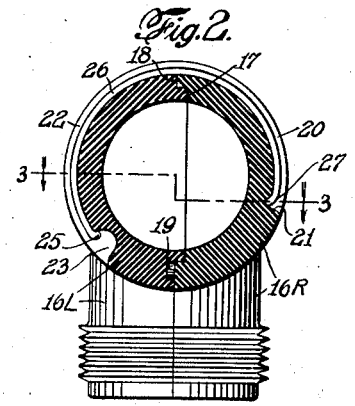
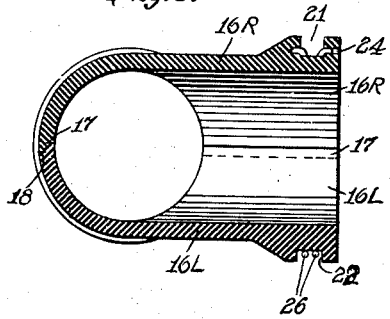
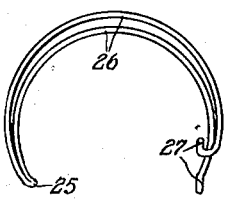
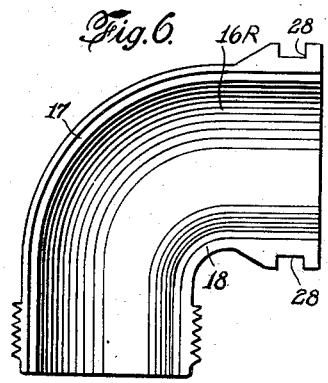
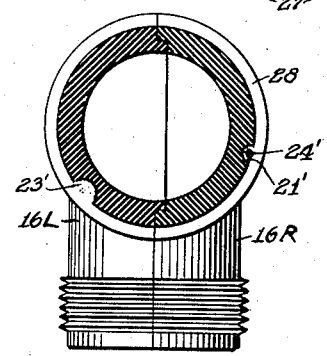
INVENTORS
SIDNEY V. HAAS, JR.
AND KENITH G. STRUNK.
BY
Cousins & Cousins
ATTORNEYS Patented Sept. 18, 1945

2,385,202

UNITED STATES PATENT OFFICE 2,385,202

SPRING CLASP FOR SPLIT CYLINDERS

Sidney V. Haas, Jr., and Kenith G. Strunk, East Orange, N. J., assignors to Breeze Corporations, Inc., Newark, N. J., a corporation of New Jersey Application August 11, 1944, Serial No. 549,053

5 Claims. (Cl. 285—211)

This invention relates to clasps for temporarily or permanently coupling two substantially equal parts of a split cylindrical object.

An object of the invention is to provide a clamp to hold two related members together.

A further purpose of the invention is to provide a clasp or shackle made from spring metal hingedly attached at one end to one of the parts, and having at its opposite, free end, a detent engageable in a cavity in the other part, the clasp being normally disposed in a partial or full circuitous groove formed in each part.

Another object is to provide a spring shackle so designed as to be automatically retained in operative position when acting as a bond, and held from casual detachment from one of the parts when in an inoperative, released position.

These objects are attained by the novel construction and arrangement of parts hereinafter described and shown in the annexed drawing, constituting a material part of this disclosure, and in which:

Figure 1 is a side elevational view of a split elbow showing the application of an embodiment of the invention.

Figure 2 is a transverse sectional view, taken on line 2—2 of Figure 1.

Figure 3 is a sectional view, taken on line 3—3 of Figure 2.

Figure 4 is a perspective view of the spring clasp in detail.

Figure 5 is a plan view of the spring before shaping to its finished form.

Figure 6 is a plan view of one of the halves of an elbow, looking at the inner side thereof and showing a continuous circumferential, spring receiving channel.

Figure 7 is an end view of the two halves of the same.

Referring to the drawing, 15 designates a plurality of partly circular elements which, when assembled, will form a continuous hollow construction.

Preferably, these elements 15 are provided at their edges or contacting surfaces with a tongue and groove construction 17—18, although dowel pins may be used, as at 19, for the same purpose, or a combination of both constructions may be used.

In the enlarged flanged end of the element 16R is formed a shallow arcuate channel 20, extending past the center to approximately 106° and terminating in a cavity 21. If desired, the channel 20 may be omitted and appropriate bosses to receive the clamp may be substituted.

The opposite side 16L has a similar, but longer channel 22, extending approximately 133°, and terminating in a cavity 23 of larger area than the cavity 21 in the opposed member.

The flange containing the cavity 21 is drilled transversely, the drilled hole 24 extending through the outer wall of the groove 21, well into the inner wall, as shown in Figure 3.

A single strand of spring wire is bent upon itself to form a closed loop 25, from which extend diverging arms 26, their ends 27 being turned at right angles oppositely outward and adapted to enter the drilled holes 24, in the manner of pintles, to provide a pivotal support, in the manner of a hinge.

These pivots 27 are slightly bent inwardly from the curvature of the arms 26, and the bight of the loop is also bent inwardly, constituting a detent for snap engagement in the cavity 23, while the arms occupy the channels 20–22.

In the modification shown in Figures 6 and 7, an annular channel 28 is formed circuitously in both parts, in the bottom of which are cavities 21' and 23', the former having a drilled hole 24' to receive the pintles 27 of the spring.

Although the foregoing is descriptive of the best known embodiments of the device, it is subject to such changes and modifications as may fall within the scope and tenor of the claims hereto appended.

Having thus described the invention, what is claimed as new and sought to be secured by Letters Patent of the United States, is:

1. In a device for clasping the parts of a cylinder split along its median plane, a circumferential groove in said cylinder, a pair of opposed transverse bearings leading outwardly from said groove in one part of the cylinder, a spring part bent to form a close bowed loop fitting more than one half the length of said groove over the split portions of the cylinder, and pintles extending at right angles from the free ends of said loop to engage in said bearings in the manner of a hinge.

2. In a device for clasping the parts of a cylinder split along its median plane, a circumferential groove in said cylinder, a pair of opposed transverse bearings leading outwardly from said groove in one part of the cylinder, a spring part bent to form a close bowed loop fitting more than one half the length of said groove over the split portions of the cylinder, pintles extending at right angles from the ends of said loop to engage in said bearings in the manner of a hinge, the other part of the cylinder having a cavity in the bottom of the groove, and a detent formed on the opposite free end of said loop to engage in the cavity.

3. In a device for clasping two equal parts of a split cylinder, an arcuate groove formed in each part extending from their contacting surfaces past the center of their peripheries, opposed drilled openings in the side walls of the groove in one of said parts at its terminus, a cavity in the bottom of the groove at its other end, a spring part doubled upon itself to form a loop and bowed to enter said groove, the end of said spring being turned oppositely outward to engage in the openings in the manner of a hinge and the closed end of the loop inbent to snappingly engage in said cavity.

4. In a device for retaining the parts of a cylinder split into two equal parts, a peripheral groove in each of said parts extending from their juxtaposed edges to points more than 90 degrees therefrom, a hole drilled transversely through the walls of said groove in one of said parts at its terminus, a spring part bent upon itself and bowed to engage in both parts of said groove simultaneously to the ends thereof, and pintles formed on the end of said spring to engage in said drilled holes.

5. In a device for retaining the parts of a cylinder split into two equal parts, a peripheral groove in each of said parts extending from their juxtaposed edges to points more than 90 degrees therefrom, a spring part bent to form a loop curved to conform to the groove in both of said parts, means to pivotally anchor the end of said spring in the end of the groove in one of said parts, and a detent formed on the bent end of said loop to snappingly engaged in the bottom of the groove at its end in the other of said parts.

SIDNEY V. HAAS, Jr.
KENITH G. STRUNK.